US012664160B2

(12) United States Patent
Mitra et al.

(10) Patent No.: US 12,664,160 B2
(45) Date of Patent: Jun. 23, 2026

(54) DATA EXPLORATION USING NATURAL LANGUAGE WITH DATA SAMPLING

(71) Applicant: Adobe Inc., San Jose, CA (US)

(72) Inventors: Subrata Mitra, Bangalore (IN);
Shubham Agarwal, West Bengal (IN);
Yeuk-Yin Chan, San Jose, CA (US);
Shaddy Garg, San Jose, CA (US);
Tong Yu, Fremont, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/675,930

(22) Filed: May 28, 2024

(65) Prior Publication Data

US 2025/0371000 A1     Dec. 4, 2025

(51) Int. Cl.
*G06F 16/24* (2019.01)
*G06F 16/2452* (2019.01)
*G06F 16/248* (2019.01)

(52) U.S. Cl.
CPC ...... G06F 16/24522 (2019.01); G06F 16/248 (2019.01)

(58) Field of Classification Search
CPC ..................... G06F 16/24522; G06F 16/248
USPC ...................................................... 707/722
See application file for complete search history.

(56) References Cited

U.S. PATENT DOCUMENTS

| | | | | |
|---|---|---|---|---|
| 10,650,007 | B2 * | 5/2020 | Azzam .................. | G06F 16/248 |
| 10,706,045 | B1 * | 7/2020 | Hasija .................. | G06F 16/243 |
| 10,719,524 | B1 * | 7/2020 | Nguyen ................ | G06F 16/248 |
| 2016/0196335 | A1 * | 7/2016 | Vee ....................... | G06F 16/338 |
| | | | | 707/722 |
| 2018/0095962 | A1 * | 4/2018 | Anderson ........... | G06F 16/2365 |
| 2018/0349377 | A1 * | 12/2018 | Verma ................... | G06N 3/045 |
| 2019/0228095 | A1 * | 7/2019 | Ergun .................. | G06F 16/248 |
| 2021/0019309 | A1 * | 1/2021 | Yadav ................. | G06F 16/2428 |
| 2023/0004562 | A1 * | 1/2023 | Chaudhuri ........... | G06F 16/243 |
| 2024/0134850 | A1 * | 4/2024 | Xu ..................... | G06F 16/24522 |
| 2024/0134865 | A1 * | 4/2024 | Bierner ................. | G06F 40/30 |
| 2024/0256533 | A1 * | 8/2024 | Yuan ..................... | G06F 40/30 |
| 2025/0087313 | A1 * | 3/2025 | O'Conchuir .......... | G16H 10/20 |

OTHER PUBLICATIONS

Devlin et al., "BERT: Pre-training of Deep Bidirectional Transformers for Language Understanding", Proceedings of NAACL-HLT, Jun. 2019, pp. 4171-4186.

(Continued)

*Primary Examiner* — Hicham Skhoun

(74) *Attorney, Agent, or Firm* — Shook, Hardy & Bacon L.L.P.

(57) ABSTRACT

In various examples, an exploratory data analytics tool obtains a natural language query and generates a structured data query for execution on a sample of a dataset based on the natural language query. In an example, an intent is determined for the query and the intent is used, at least in part, to determine the most appropriate sample. In addition, the intent, in some examples, is used to generate recommended queries. A user interface of the exploratory data analytics tool, for example, can display the recommended queries and/or the results of the structured data query on the sample.

20 Claims, 9 Drawing Sheets

(56)                    References Cited

OTHER PUBLICATIONS

El et al., "Automatically Generating Data Exploration Sessions Using Deep Reinforcement Learning", SIGMOD '20: Proceedings of the 2020 ACM SIGMOD International Conference on Management of Data, Jun. 2020, 11 pages.

Garg et al., "Reinforced Approximate Exploratory Data Analysis", The Thirty-Seventh AAAI Conference on Artificial Intelligence (AAAI-23), Feb. 2023, pp. 7660-7669.

Lai et al., "Sequence-Aware Query Recommendation Using Deep Learning", Proceedings of the VLDB Endowment, vol. 12, 2020, 14 pages.

Lai et al., "Workload-Aware Query Recommendation Using Deep Learning", Proceedings of the 26th International Conference on Extending Database Technology (EDBT), Mar. 2023, pp. 53-65.

Milo et al., "Next-step Suggestions for Modern Interactive Data Analysis Platforms", Proceedings of the 24th ACM SIGKDD International Conference on Knowledge Discovery & Data Mining, Aug. 2018, pp. 576-585.

Mozafari et al., "A Handbook for Building an Approximate Query Engine", Bulletin of the IEEE Computer Society Technical Committee on Data Engineering, 2015, pp. 3-29.

Raffel et al., "Exploring the Limits of Transfer Learning with a Unified Text-to-Text Transformer", Journal of Machine Learning Research, vol. 21, No. 1, 2020, 67 pages.

Scholak et al., "PICARD: Parsing Incrementally for Constrained Auto-Regressive Decoding from Language Models", Proceedings of the 2021 Conference on Empirical Methods in Natural Language Processing, Nov. 2021, pp. 9985-9901.

Yu et al., "Spider: A Large-Scale Human-Labeled Dataset for Complex and Cross-Domain Semantic Parsing and Text-to-SQL Task", Proceedings of the 2018 Conference on Empirical Methods in Natural Language Processing, 2018, pp. 3911-3921.

* cited by examiner

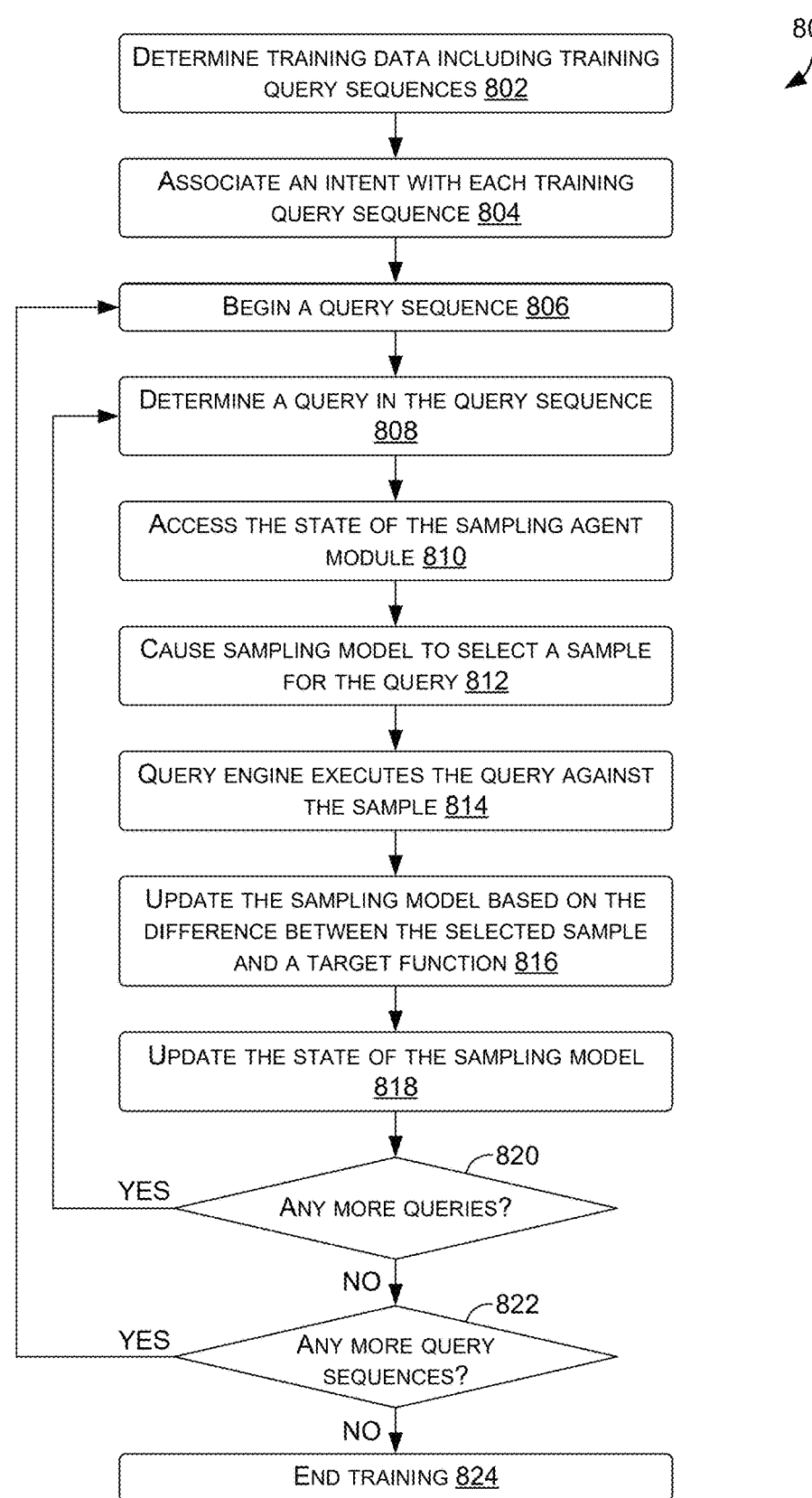

*800*

DETERMINE TRAINING DATA INCLUDING TRAINING QUERY SEQUENCES <u>802</u>

ASSOCIATE AN INTENT WITH EACH TRAINING QUERY SEQUENCE <u>804</u>

BEGIN A QUERY SEQUENCE <u>806</u>

DETERMINE A QUERY IN THE QUERY SEQUENCE <u>808</u>

ACCESS THE STATE OF THE SAMPLING AGENT MODULE <u>810</u>

CAUSE SAMPLING MODEL TO SELECT A SAMPLE FOR THE QUERY <u>812</u>

QUERY ENGINE EXECUTES THE QUERY AGAINST THE SAMPLE <u>814</u>

UPDATE THE SAMPLING MODEL BASED ON THE DIFFERENCE BETWEEN THE SELECTED SAMPLE AND A TARGET FUNCTION <u>816</u>

UPDATE THE STATE OF THE SAMPLING MODEL <u>818</u>

ANY MORE QUERIES? — 820

YES   NO

ANY MORE QUERY SEQUENCES? — 822

YES   NO

END TRAINING <u>824</u>

*FIG. 8*

DATA EXPLORATION USING NATURAL LANGUAGE WITH DATA SAMPLING

BACKGROUND

Data analysts often seek to gain insights into patterns in large datasets. For instance, these datasets can describe online activity of users, purchasing behaviors of customers, business operations, environmental phenomena, or a wide variety of other activities. By identifying patterns in datasets, analysts can enable decision-making that can benefit people and business in a wide range of fields. In exploratory data analytics (EDA), an analyst interactively organizes a dataset by, for instance, filtering, grouping, or plotting data, which can be performed by querying the dataset. A query processor processes each query and outputs a response. The analyst examines the query response to decide on a subsequent query. This cycle of queries and responses continues until the analyst ends the session. The sequence of queries entered by the analyst can lead to interesting insights, such as hidden patterns in the dataset. Often, EDA involves this type of interactive analysis and insight generation based on large datasets, which may include terabytes of data, for instance.

EDA and other data analytics systems are limited in their abilities to run queries in a timely manner against large datasets by available computing resources. For instance, a query could take minutes or hours to run in typical computing environments. A long latency between a query and its result can hamper the cognitive flow of an analyst and, as a result, degrade the potential for insight generation. To address this issue, some EDA systems run queries against samples (e.g., subsets) of the dataset, rather than against the full dataset. The use of samples can enable faster query processing. However, EDA is a sequential process, and errors introduced due to sampling can divert the analysis flow because users often rely on previous query responses to decide the next queries to run. Thus, although using samples can address the latency issue in EDA systems to some degree, the use of sampling introduces errors that skew results.

SUMMARY

Embodiments described herein are directed to a query system that combines a natural language processing (NLP) interface for insight discovery with an underlying sample-based exploratory data analytics (EDA) system. The NLP interface can convert high-level questions into contextual queries of a dataset (e.g., database queries), while the backend EDA system significantly speeds up insight discovery by selecting the most optimum sample from among many pre-created samples using various sampling strategies.

For example, the backend (e.g., the EDA system) determines a particular sample to use for each query in a query sequence provided to the EDA system, so as to facilitate a workflow that preserves an implicit intent of a user. In particular, the EDA system includes a sampling machine learning model to determine which sample to use based on implicit intents of query sequences. The sampling machine learning model, for example, automatically selects a sample, and thus an associated sampling strategy, of a dataset for a given query. In some examples, the sampling machine learning model has been trained to select an appropriate sample via reinforcement learning, such as deep reinforcement learning, based on a reward function that considers latency, intent, termination characteristics, or a combination of these factors.

Furthermore, the frontend (e.g., the NLP interface) provides an interactive NLP-based interface that can accept high-level questions about the data and produces query recommendations (e.g., structured data queries). The user can then directly run these queries or perform further edits to these queries. The system, in an embodiment, detects the intent (e.g., the kind of insight the user is looking for) based on historical analysis patterns from expert users, and in response, progressively recommends queries that will direct the user to the detected methodology. In one example, the sequence of previously run queries and corresponding results and/or visualizations are used to determine, by the sampling machine learning model, a context of the generated query and the optimal sampling strategy to optimize the user's search while protecting against intent-divergence. Furthermore, in some embodiments, the NLP interface indicates a confidence value associated with the result based on the selected sampling strategy given the query and the intent.

Additionally, in such embodiments, an intent model classifies the query sequence as belonging to a cluster and/or topic, and that cluster is deemed to be the intent associated with the query sequence. In one example, the sampling machine learning model uses as inputs the query, the response, the intent, and the query sequence so far. When the next query is received, the state of the sampling machine learning model is updated and used to determine an appropriate sample for that next query. Furthermore, the intent determined by the sampling machine learning model, in an embodiment, is used to determine a set of recommended queries based on a repository of previously performed EDA sessions. The sequence of receiving a query, selecting a sample, generating recommended queries, generating a response, and updating the sampling machine learning model's state is repeatable until the user ends the EDA session. Thus, advantageously, in various embodiments, the systems and methods described are directed towards fast and efficient interactive data exploration workflows that provide a natural language interface for ease of use.

BRIEF DESCRIPTION OF THE DRAWINGS

The present disclosure is described in detail below with reference to the attached drawing figures, wherein:

FIG. 8 depicts an example process flow for training a machine learning model to select a sample for a query, in accordance with at least one embodiment.

DETAILED DESCRIPTION

Figure 1:
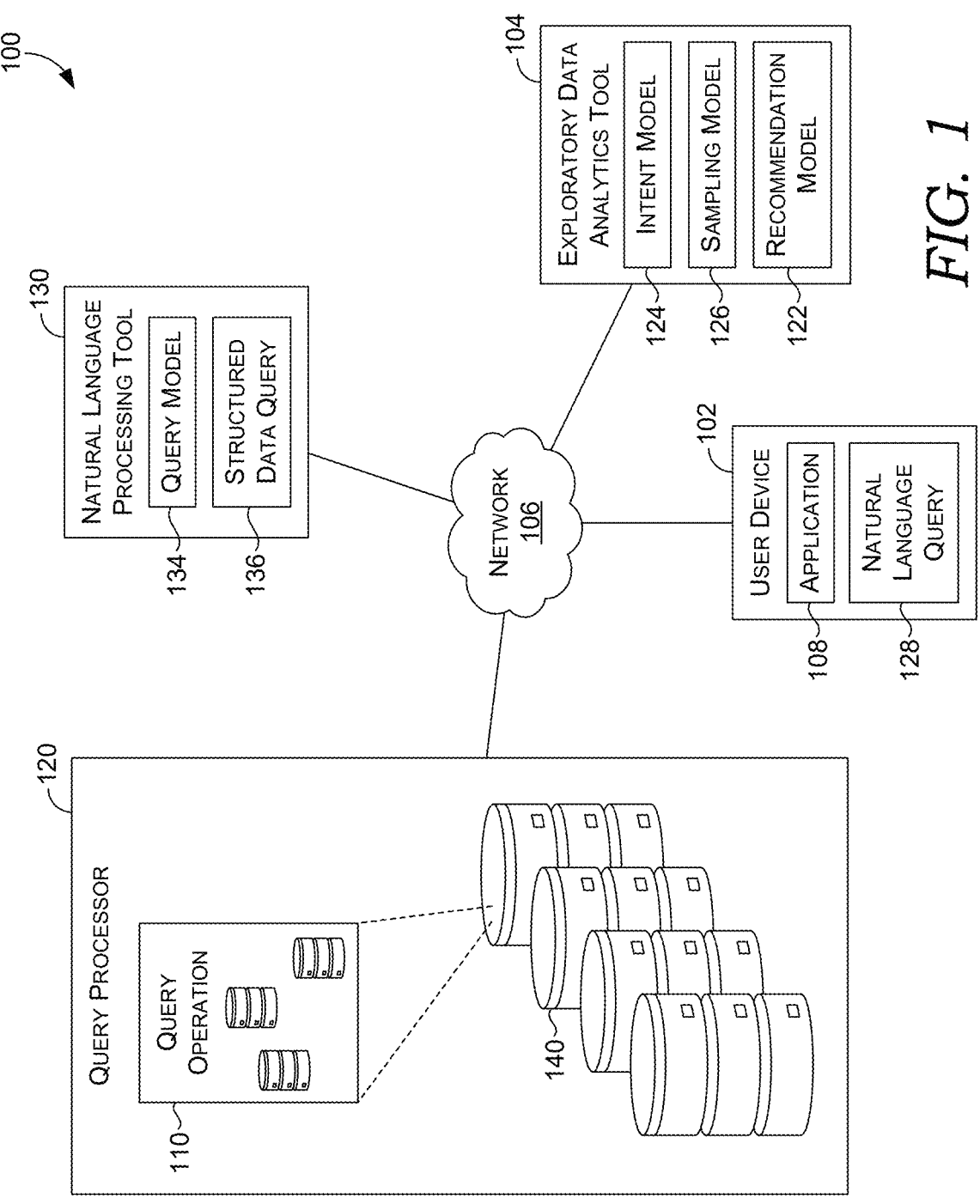
FIG. 1 depicts an environment in which one or more embodiments of the present disclosure can be practiced.

Embodiments described herein generally relate to an exploratory data analytics (EDA) system that enables interactive, efficient, and guided exploratory data analysis. In accordance with some aspects, the systems and methods described are directed to performing EDA using natural language queries, which are translated or otherwise converted to structured data queries that can be executed using downsampled data (e.g., sampled data that is less than the entire dataset). In addition, in some embodiments, the intent of the queries is determined and used to select a particular sample and to generate recommendations for additional queries to guide the user in accordance with a particular analysis methodology.

However, as described above, the ability to extract insights from large amounts of data in a timely manner is critical, and executing queries on an entire dataset causes delay and takes unnecessary time. In addition, in many cases, this process is carried out by non-programmers within tight time constraints, such as in a marketing campaign where a marketer must quickly analyze large amounts of data to determine valuable insights. In particular, challenges arise in (1) running queries against data samples rather than against a full dataset in EDA systems or other data analytics environments and (2) creating structured data queries. First, sampling creates approximation errors and can mislead a user (e.g., an analyst) in an interactive data exploration session. For instance, the response of a previous query can be distorted due to the particular sample used and may prompt the user toward a non-optimal path of analysis. Numerous sampling techniques are available, and while a particular sampling technique for a given query could minimize such distortion, the best sampling technique for a given query depends on the particular structure of the query, the context of the query within a larger sequence of queries, and the underlying data distribution of the dataset. In an interactive data exploration workflow in an EDA system, where multiple types of queries are used in sequence, there is often not a single sampling strategy that should be used for each query. Thus, it is not always clear to an analyst which sampling technique to use, and that choice can be important for the data analysis.

In addition, marketers and other users of EDA systems many times are not proficient with common interfaces for processing datasets stored in various data structures, such as structure query languages (SQL) and python. Furthermore, during time-critical scenarios there may not be enough time to seek or communicate the need to SQL experts or analysts. Aspects of the technology described herein provide a number of improvements over existing technologies. In one example, the EDA system includes a sampling machine learning model that is trained to determine which sample to use based on the intent associated with query sequences. In this example, the selected sample is associated with a sampling strategy for a given query. In some examples, the sampling machine learning model is trained using reinforcement learning (RL), such as deep reinforcement learning (DRL), based on a reward function that considers latency, intent, termination characteristics, or a combination of factors.

In this example, the sampling machine learning model can be trained (e.g., offline or otherwise prior to execution of the session), such as via reinforcement learning, to select samples for queries based on latency, intent, and termination characteristics, and as a result, the sampling model can select a respective sample against which each query can be processed with relatively low latency to preserve the analyst's implied intent in a given query sequence. Continuing this example, the EDA system includes or otherwise has access to a natural language processing (NLP) model used to generate structured data queries (e.g., SQL). A user interface, in some embodiments, is used to obtain natural language queries from users that are then converted to structure queries. In addition, the user interface can present recommendations for additional queries based on the natural language queries and/or the intent of queries.

Furthermore, in various embodiments, the EDA system determines an implicit intent of the user based on a query and/or query sequence for a particular session. For instance, the sampling model includes a topic model, which classifies the query sequence as belonging to a topic, and that topic is deemed to be the intent of the user and, thus, the intent associated with the query sequence. The sampling machine learning model then takes as an input the query (e.g., a query vector generated based on the structured data query) and the intent and determines a sample to be used by a query processor to execute the query. Furthermore, in some embodiments, a confidence value is calculated that represents the confidence in the result based on the sample selected. For example, the confidence value is calculated based on the estimation of the variance for the result using the sample selected. This confidence information can be surfaced to the user during the session and, for instance, indicates the performance of the sample machine learning model.

The sequence of receiving a natural language query, generating a structured data query, selecting a sample, generating a recommendation, generating a response (e.g., the result and/or a visualization of the data in the result), and updating the state associated with sampling model, in various embodiments, is repeated until the user ends the session. Thus, returning to the example above, the interactive data exploration workflow is facilitated by the EDA system—specifically, the system allows for natural language queries and includes a sampling machine learning model that facilitates low-latency query responses that preserve the user's intent, so as to preserve the potential for insight generation despite the use of samples in place of the dataset in full.

Turning to FIG. 1, FIG. 1 is a diagram of an operating environment 100 in which one or more embodiments of the present disclosure can be practiced. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory, as further described with reference to FIG. 9.

It should be understood that operating environment 100 shown in FIG. 1 is an example of one suitable operating environment. Among other components not shown, operating environment 100 includes a user device 102, an exploratory data analytics (EDA) tool 104, a natural language processing (NLP) tool 130, a query processor 120, and a network 106. Each of the components shown in FIG. 1 can be implemented via any type of computing device, such as one or more computing devices 900 described in connection with FIG. 9, for example. These components can communicate with each other via network 106, which can be wired, wireless, or both. Network 106 can include multiple networks, or a network of networks, but is shown in simple form so as not to obscure aspects of the present disclosure. By way of example, network 106 can include one or more wide area networks (WANs), one or more local area networks (LANs), one or more public networks such as the Internet, and/or one or more private networks. Where network 106 includes a wireless telecommunications network, components such as a base station, a communications tower, or even access points (as well as other components) can provide wireless connectivity. Networking environments are commonplace in offices, enterprise-wide computer networks, intranets, and the Internet. Accordingly, network 106 is not described in significant detail.

It should be understood that any number of devices, servers, and other components can be employed within operating environment 100 within the scope of the present disclosure. Each can comprise a single device or multiple devices cooperating in a distributed environment. For example, the EDA tool 104 includes multiple server computer systems cooperating in a distributed environment to perform the operations described in the present disclosure. Furthermore, in various embodiments, such as the environment illustrated in FIG. 3 below, the EDA tool 104, the query processor 120, and the NLP tool 130 are executed by the same computing devices and/or as part of a single system.

User device 102 can be any type of computing device capable of being operated by an entity (e.g., individual or organization) and obtains data from the EDA tool 104 and/or a data store that can be facilitated by the EDA tool 104 (e.g., a server operating as a frontend for the data store). The user device 102, in various embodiments, enables a user to provide a natural language query 128. For example, the application 108 include a user interface that accepts from the user the natural language query 128. In one example, the user, via an input device (e.g., keyboard, microphone, etc.) provides the natural language query 128 to the application 108. In various embodiments, the natural language query 128 corresponds to a dataset and/or database being searched by the user via the EDA tool 104.

In some implementations, user device 102 is the type of computing device described in connection with FIG. 9. By way of example and not limitation, the user device 102 can be embodied as a personal computer (PC), a laptop computer, a mobile device, a smartphone, a tablet computer, a smart watch, a wearable computer, a personal digital assistant (PDA), a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 102 can include one or more processors, and one or more computer-readable media. The computer-readable media can also include computer-readable instructions executable by the one or more processors. In an embodiment, the instructions are embodied by one or more applications, such as application 108 shown in FIG. 1. Application 108 is referred to as a single application for simplicity, but its functionality can be embodied by one or more applications in practice.

In various embodiments, the application 108 includes any application capable of facilitating the exchange of information between the user device 102 and the EDA tool 104, NLP tools 130, and/or the query processor 120. For example, the application 108 enables users to execute EDA sessions to determine insights from a large dataset by accepting the natural language query 128, causing the NLP tool 130 to generate a structured data query 136 using a query model 134, causing the EDA tool to select a sample of the dataset using a sampling model 126, and obtaining and/or displaying a result of a query operation 110 executed on the sample using the structured data query 136. In some implementations, the application 108 comprises a web application, which can run in a web browser, and can be hosted at least partially on the server-side of the operating environment 100. In addition, or instead, the application 108 can comprise a dedicated application, such as an application being supported by the user device 102 and the EDA tool 104. In some cases, the application 108 is integrated into the operating system (e.g., as a service). It is therefore contemplated herein that "application" be interpreted broadly.

For cloud-based implementations, for example, the application 108 is utilized to interface with the functionality implemented by the knowledge distillation tool 104. In some embodiments, the components, or portions thereof, of the knowledge distillation tool 104 are implemented on the user device 102 or other systems or devices. Thus, it should be appreciated that the entities illustrated in FIG. 1, in some embodiments, are provided via multiple devices arranged in a distributed environment that collectively provide the functionality described herein. Additionally, other components not shown can also be included within the distributed environment.

As illustrated in FIG. 1, the EDA tool 104, in various embodiments, enables interactive data exploration in which a query sequence is executed to analyze a dataset 140, enabling the discovery of insights about the dataset 140. For example, a query sequence is a series of queries provided in an actual or simulated EDA session through the application 108 to analyze the dataset 140 using the EDA tool 104, the NLP tool 130, and query processor 120. As shown in the example illustrated in FIG. 1, the EDA tool 104 includes the sampling model 126, a recommendation model 122, and an intent model 124, and the EDA tool 104 communicates with the NLP tool to obtain the structured data query 136 generated by the query model 134 based on the natural language query 128. In one example, the EDA tool 104 includes a computer system configured to be used by a human user or an automated user to analyze the dataset 140, such as for the purpose of discovering insights about those datasets. In some embodiments, the EDA tool 104 is implemented as one or more computing devices running program code to cause a processing unit to run queries, access data, or perform other tasks on datasets.

In various embodiments, the dataset 140 is a collection of various types of data stored in a structured or unstructured format. For instance, the dataset 140 can maintain information describing financial transactions, user data, demographics, flight data, residential information, historical data, business transactions, web activity, purchase transactions, or various other data. In some embodiments, the dataset 140 is stored in one or more databases, database tables, text files, other storage objects, or a combination of these. For example, the dataset 140 is stored in a structure query language (SQL) database or one or more SQL database tables. In other examples, the dataset 140 is stored in a relational database, a key-value data store, a document-based model, or a graph. In various embodiments, the dataset 140 is maintained in a structured and/or unstructured data store such that queries can be executed on the dataset 140.

In various embodiments, the query processor 120 runs or otherwise executes queries (e.g., the structured data query 136) against samples of the dataset 140. In one example, a sample of the dataset 140, as described in greater detail below in connection with FIG. 2A, includes a subset of the data included in the dataset 140. In some embodiments, the query processor 120 includes an application or other executable code that, when executed by a computer device, executes a query against the sample or against the dataset 140 as a whole. In one example, the query processor 120 is an SQL query processor that executes the structured data query 136 by at least obtaining data from rows and/or columns of the sample that satisfies the query (e.g., the query processor 120 will return results from a table based on the query).

As described in greater detail below in connection with FIG. 2A, the sample includes a downsampled representation of the dataset 140. For example, the sample is generated by applying a sampling strategy to the dataset 140 to down-sample the dataset such that the sample contains less data than the dataset 140. In various embodiments, the sample is a subset of the dataset and does not include all data of the dataset 140. In some embodiments, processing the sample of the dataset 140 consumes less computing resources and requires the query processor 120 less time to search and/or process the dataset 140 as a whole.

In various embodiments, the natural language query 128 includes a question asked by the user of the application. In one example, as described in greater detail below, the user asks the natural language query 128 "how many flights are there on each day of the week?" In this example, the natural language query 128 includes every-day and/or common language that the user utilizes to submit a query. In various embodiments, the NLP tool uses the query model 134 to convert or otherwise translate the natural language query 128 to the structured data query 136. In one example, the query model 134 include a trained machine learning model that takes as an input the natural language query 128 and generates the structured data query 136, which includes executable code that, when executed by the query processor 120, causes the query processors 120 to perform an operation over the sample and/or dataset 140

In various embodiments, the structured data query 136 includes any query that can be executed or otherwise operates on the dataset 140, including structured and unstructured data. For instance, the query directs an operation to certain rows or columns of the sample and/or the dataset 140, leading to an output, results, and/or response based on data in the sample or the dataset 140. In some examples, the structured data query 136 is defined in Structured Query Language (SQL) or in another language.

In various embodiments, the query model 134 is trained on label data to transform natural language (e.g., the natural language query) to executable code that is executable by the query processor 120. In one example, the query model 134 is generated by fine-tuning a pre-trained model such as a text-to-text transfer transformer (T5), a Bidirectional Encoder Representations from Transformers (BERT), or other machine learning model. In other examples, the query model 134 includes a large language model (LLM). In an embodiment, the application 108 initiates a session with the EDA tool 104 and provides the NLP tool 130 with a series of natural language queries, which are converted to structured data queries by the query model 134 and provided to the EDA tool 104.

In one example, a query sequence includes a set of queries provided to the EDA tool 104 representing a session. In one embodiment, a human analyst submits a query sequence as a series of queries, each query submitted after receiving a response from the previous query in the series. For example, each query in a query sequence is directed against a common dataset (e.g., the dataset 140). However, in some embodiments, each query need not be executed against the same sample of that common dataset.

In an embodiment, the EDA tool 104 obtains the structured data query 136 and determines an intent associated with the structured data query 136. For example, the intent model 124 is trained to determine an intent related to or otherwise associated with the structured data query 136 and/or a query sequence. In various embodiments, the intent refers to a description or topic of the structured data query 136 and/or the query sequence. In one example, the intent model 104 includes an unsupervised machine learning model, such as a biterm topic model (BTM), trained using historical query sequences (e.g., a history of queries submitted to the EDA tool 104) to generate a trained machine learning model (e.g., the intent model 124) to determine the intent for the structured data query 136 and/or the query sequence. In addition, in some embodiments, the intent model 104 is trained to determine a visualization for the structured data query 136. In one example, the visualization includes a graph, image, or other visualization to display the results of the structured data query 136 to a user.

Furthermore, in some embodiments, the intent of a query sequence is a basis for selecting a sample for use in executing a given query of the query sequence. For example, the intent (e.g., value outputted by the intent model 124 based on the structured data query 136 and/or the query sequence provided as an input to the intent model 124) is provided as an input to the sampling model 126. In various embodiments, the sampling model 126 selects an existing sample, and thus selects the associated sampling strategy from among a set of available samples based on an input including the intent, the structured data query 136, and/or the query sequence. Furthermore, in an embodiment, the sampling model 126 is trained using intent-based reinforcement learning, which refers to a process of reinforcement learning in which a machine-learning model is trained to consider an intent of a query sequence in generating an output. For example, a reward function is used that rewards the sampling model 126 for certain outputs, such that the reward values generated for the output of the sampling model 126 preserves the intent, among other factors, as determined by the intent model 124.

In various embodiments, the recommendation model 122 generates query recommendations based on past user sessions, the structured data query 136, the query sequence, and/or the intent. In one example, the recommendation model 122 is trained using a repository of previously performed EDA sessions (e.g., previously executed query sequences) and topic modeling is performed to extract a set of implicit intents from these previously performed EDA sessions. Continuing this example, the recommendation model 122 takes as an input a current EDA session and the historical sessions (e.g., from the repository of previously performed EDA sessions) and models both as trees in order to identify the top-k similar subtrees. In an embodiment, a similarity score is used to identify similar subtrees, where the score is a combination of tree edit distance and an intent similarity. For example, the score for the tree edit distance is determined based on edit operations (e.g., delete/add a node or an edge and alter the label of a node or an edge), where the edit distance is computed by summing the cost of these operations required to transform one tree into another. In this example, the edit operations have an associated cost (e.g., the add/delete operations have a first cost value and the alter operations have a second cost value), which reflects the similarity between data displays and analysis actions. Additionally, in some embodiments, the score is calculated or otherwise determined based on the cosine similarity of the intent vectors between the current user session and the previous sessions. Based on a set of similar trees identified by the recommendation model 122 (e.g., using the scores for the trees as described above), the recommendation model 122, in various embodiments, determines the set of recommended queries based on nodes (e.g., in the set of similar subtrees) that correspond to the current user node and selects outgoing edges (e.g., representing specific queries) from the nodes that correspond to the current user node.

In one example, a user (e.g., by interacting with the application 108 via the user device 102) begins an EDA session with the EDA tool 104 by submitting the natural language query 128, which is converted to the structured data query 136 and provided to the EDA tool 104 to begin a particular query sequence and/or session. Continuing this example, the sampling model 126 receives the structured data query 136 and the corresponding intent and, based on a policy previously learned during training, as applied to the query and to a state of the sampling model 126, the sampling model 126 selects a sample from among available samples of the dataset. For example, the structured data query 136 is represented as a query vector, and that vector may be taken as input (along with a value representing the intent generated by the intent model 124) by the sampling model 126. In this example, the sampling model 126 includes one or more neural networks, which process the query vector and/or value representing the intent to determine the sample. Finally, in this example, the query processor 120 then performs a query operations 110 by at least executing the structured data query 136 against the sample to generate and output a response. In various embodiments, the response includes a response vector that the EDA tool 104 uses to generate a visualization of the response in a format that facilitates human reading. For example, the result of the query operation 110 (e.g., the response) can be displayed in a user interface such as those described in greater detail below in connection with FIGS. 4-6.

Returning to the example above, during operation of the EDA tool 104 the sample selection is performed by the sampling model 126 and takes as an input: (1) information indicating intent associated with or otherwise extracted from queries obtained from historical data (e.g., previously executed session), (2) the current session (e.g., the query sequence provided by the user through the application 108) including the corresponding display and/or outputs (e.g., graphs and dataframes), (3) the next query the user is intending to execute (e.g., a query selected by the user from the set of recommended queries), and (4) the set of available samples created with different sampling strategies along with the size of each sample. In various embodiments, the sampling model 126, which is parameterized by a deep neural network, is trained offline (e.g., prior to executing a session) to select an optimal sampling strategy as the best action (e.g., the action that maximizes a reward value generated by a reward function) for different context of the analyses and intent. In this example, the best action (e.g., the reward function) corresponding to each step (e.g., for each query in the session and/or the query sequence) attempts to minimize a divergence of intents due to approximation error caused by different samples, while optimizing the latency reduction of queries.

In various embodiments, EDA tool 104 also indicates a confidence associated with the result or visualization created by executing the query operation 110 on the sample selected by the sampling model 126. In one example, the confidence includes a value calculated based on the estimation of the variance for the result using the particular selected sample. In an embodiment, the confidence is estimated using a closed form expression (e.g., a formula that estimates the variance). In other embodiments, the confidence is determined by executing the query operation 110 a plurality of times using subsamples of the sample (e.g., ten percent of data of the sample) and determining the variance in the results (e.g., bootstrapping operations).

Figure 2A:
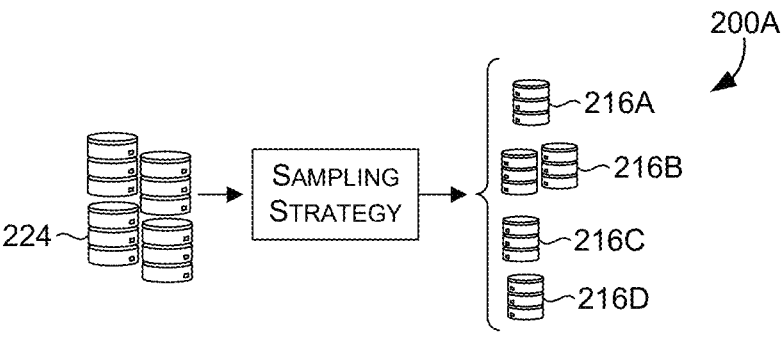
FIG. 2A depicts an environment in which a set of samples of a dataset are generated, in accordance with at least one embodiment.

FIG. 2A is an illustration of an environment 200A in which a plurality of samples 216 are generated from a dataset 224 in accordance with at least one embodiment. In an embodiment, the samples 216A-216D are generated from the data 224 using a plurality of distinct sampling strategies and/or algorithms. In an embodiment, the samples 216A-216D are generated using a combination of sampling algorithms. Furthermore, in various embodiments, the dataset 224 includes any data stored in a structured or unstructured data store. In one example, the dataset 224 includes flight data stored in a database. In another example, the dataset 224 includes data generated by a website and/or service provided by a service provider.

In an embodiment, the plurality of samples 216 of the dataset 224, such as a first sample 216A, a second sample 216B, a third sample 216C, and a fourth sample 216D include a subset of data of the dataset 224. For example, the dataset 224 is represented as one or more database tables, and the plurality of samples 216 include a subset of the rows and/or columns of the one or more database tables. As a result, in an embodiment, the first sample 216A represents the dataset 224 but is a proper subset (e.g., excludes some portion of the dataset 224) such that the first sample 216A is smaller than the dataset 224 as a whole (e.g., includes less data relative to the dataset 224). Therefore, in such an embodiment, it is typically faster to execute a query (e.g., the structured data query 136) using the first sample 216A rather than the dataset 224.

In some embodiments, samples of the plurality of samples 216 (e.g., samples 216A-216D) are associated with a respective sampling strategy. For example, the first sample 216 is generated based on a first sampling strategy and includes a result of applying the first sampling strategy to the dataset 224; the second sample 216B is generated based on a second sampling strategy and includes a result of applying the second sampling strategy to the dataset 224; the third sample 216C is generated based on a third sampling strategy and includes a result of applying the third sampling strategy to the dataset 224; and the fourth sample 216D is generated based on a fourth sampling strategy and includes a result of applying the fourth sampling strategy to the dataset 224. In this example, each of the first sampling strategy, second sampling strategy, third sampling strategy, and fourth sampling strategy is distinct, and, as a result, the first sample 216A, the second sample 216B, the third sample 216C, and the fourth sample 216D includes distinct subsets of data from the dataset 224.

In an embodiment, the plurality of samples 216 as a collective are generated using multiple sampling strategies with each sample (e.g., samples 216A-216D) using one or more of the sampling strategies. In some examples, the sampling strategies include uniform random sampling, systematic sampling, stratified sampling, proportional stratified sampling, cluster sampling, or diversity sampling.

In some embodiments, the plurality of samples 216 are generated or otherwise determined offline (e.g., prior to a session of the EDA tool 104, as described above). In such embodiments, the sampling model 126 selects or otherwise determines a generated sample (e.g., samples 216A-216D), and, as a result, selects the associated sampling strategy, from among the available samples that were previously generated, as described above. In various embodiments, the use of predetermined and/or pregenerated samples can reduce latency during runtime (e.g., execution of session), as compared to generating samples as needed (e.g., in response to a query). Additionally or alternatively, however, in some embodiments, the EDA tool 104 and/or component thereof, such as the sampling model 126, generates or causes to be generated a particular sample on demand (e.g., in response to determining a particular sample to use to process the query). In such embodiments, for instance, the sampling model 126 selects a sampling strategy and then applies that sampling strategy to the dataset 224 to generate a sample (e.g., first sample 216A). Generating samples 216A-216D on demand can be used in embodiments where the dataset 224 is dynamic (e.g., can change between queries and or sessions). However, in such embodiments, where the dataset 140 is dynamic, it may be beneficial to generate at least a portion of the samples 216A-216D offline and/or update the sample as needed in order to reduce latency during runtime.

Figure 2B:
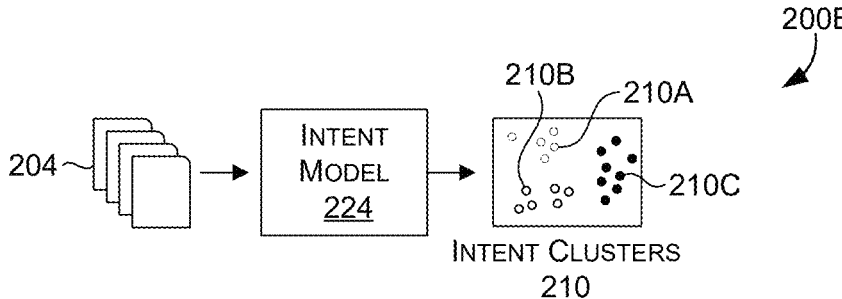
FIG. 2B depicts an environment in which a machine learning model is trained to determine an intent associated with a query, in accordance with at least one embodiment.

FIG. 2B is an illustration of an environment 200B in which an intent model 224 is trained to determine an intent associated with a query in accordance with at least one embodiment. In various embodiments, the intent model 224 is trained using historical data 204. In one example, the trained intent model 224 is used to detect the intent (e.g., the kind of insight a user is looking for) based on the historical data 204. In various embodiments, the historical data 204 includes curated data obtained from historical analysis patterns from expert and/or experienced users of the EDA tool 104 or other data analysis tools. In other embodiments, the historical data 204 includes a set of queries to a dataset, such as the dataset 224. As described above, in various embodiments, the intent determined by the trained intent model 224, in various embodiments, is used to progressively (e.g., over an interval of time based on a query sequence provided by a user) recommend queries that will help direct users into a particular analysis flow and or methodology. For example, users of the EDA tool 104 or another data analysis tool develop particular methodologies and/or flows for exploring data and determining insights that are captured within the historical data 204 and extracted and/or modeled by the intent model 224.

In various embodiments, the intent model 224 is trained using unsupervised learning techniques. In one example, a biterm topic model (BTM) based on historical analysis of query sequences included in the historical data 204 is used to train the intent model 224. In addition, in various embodiments, the historical data 204 includes information indicating visualization used to display the results of queries. In such embodiments, the intent model 224 is also trained to select or otherwise determine a visualization for a particular query or sequence of queries. In the example illustrated in FIG. 2B, the intent model 224 maps intents to a plurality of intent clusters 210 such as a first intent 210A, a second intent 210B, and a third intent 210C. In various embodiments, the intents 210A-210C represent a particular latent style of data exploration in search of a specific type of insight. For example, the intents 210A-210C are used during a session by the EDA tool 104 for both sample selection and query recommendations.

In some embodiments, the intent model 224 determines a set of topics based on training data including the historical data 204. In one example, given input in the form of a query sequence, the intent model 224 classifies the current query and/or the query sequence as associated with a particular topic in the set of topics (e.g., the intents 210A-210C). In an embodiment, the intent is represented as an intent distribution indicating a weight or probability for a set of available intents (e.g., the intents 210A-210C).

In embodiments where the intent model 224 includes a BTM model, the intent model 224 generates as a topic distribution indicating a weight or probability for a set of available topics. For example, the intent model 224 identifies topics among the training query sequences included in the historical data 204 and clusters the training query sequences according to those topics (e.g., intent clusters 210), such that each training query sequence is associated with a respective topic. Continuing this example, the topics are then used as the intents 210A-210C during the training process illustrated in FIG. 2B. More specifically, in this example, if a first training query sequence is associated with a first topic, then that first training query sequence is deemed to have the first intent 210A. In some embodiments, in an unsupervised learning process of associating the training query sequences or other information in the historical data 204 with respective intents (e.g., the intents 210A-210C), the intent model 224 associates an input query or input query sequences with respective intent distributions (e.g., topic distributions) indicating to what degree each input is associated with the intents 210A-210C.

Figure 2C:
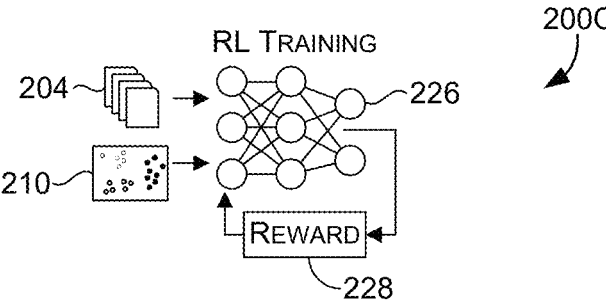
FIG. 2C depicts an environment in which a machine learning model is trained to select a sample for a query, in accordance with at least one embodiment.

FIG. 2C is an illustration of an environment 200C in which a sampling model 224 in trained to select a sample to be used to execute queries in accordance with at least one embodiment. In various embodiments, the historical data 204 and intent clusters 210 or individual intents (e.g., the intents 210A-210C) are used as inputs to train the sampling model 226. In various embodiments, the historical data includes data as described above in connection with FIG. 2B. However, in addition or alternatively, the historical data 204, in various embodiments, includes simulated data such as simulated queries to the dataset 224. Although simulated data is described in connection with training the sampling model 226, simulated data can be used to train any of the models described in the present disclosure, such as the intent model 224. In one example, simulated query sequences are used in training data to train both the intent model 224 and the sampling model 226.

In various embodiments, the sampling model 226 is trained to approximate a selection function for selecting samples 216A-216D, where the selection function is based on a reward model 228 that rewards the sampling model 226 for certain choices. In one example, the rewards model 228 is based on preserving intent (e.g., the intent 210A-210C) determined by the intent model 224 based on a particular query and/or query sequence. In some embodiments, the sampling model 226 includes, or has access to, a query processor (e.g., the query processor 120) in order to execute queries during training.

In some embodiments, the sampling model 226 is trained through reinforcement learning. For example, during reinforcement learning, the sampling model 226 interacts with the reward model 228 and maximizes the reward value in order to optimize a policy. In various embodiments, the sampling model 226 is trained using the method 800 described in greater detail below in connection with FIG. 8.

Figure 3:
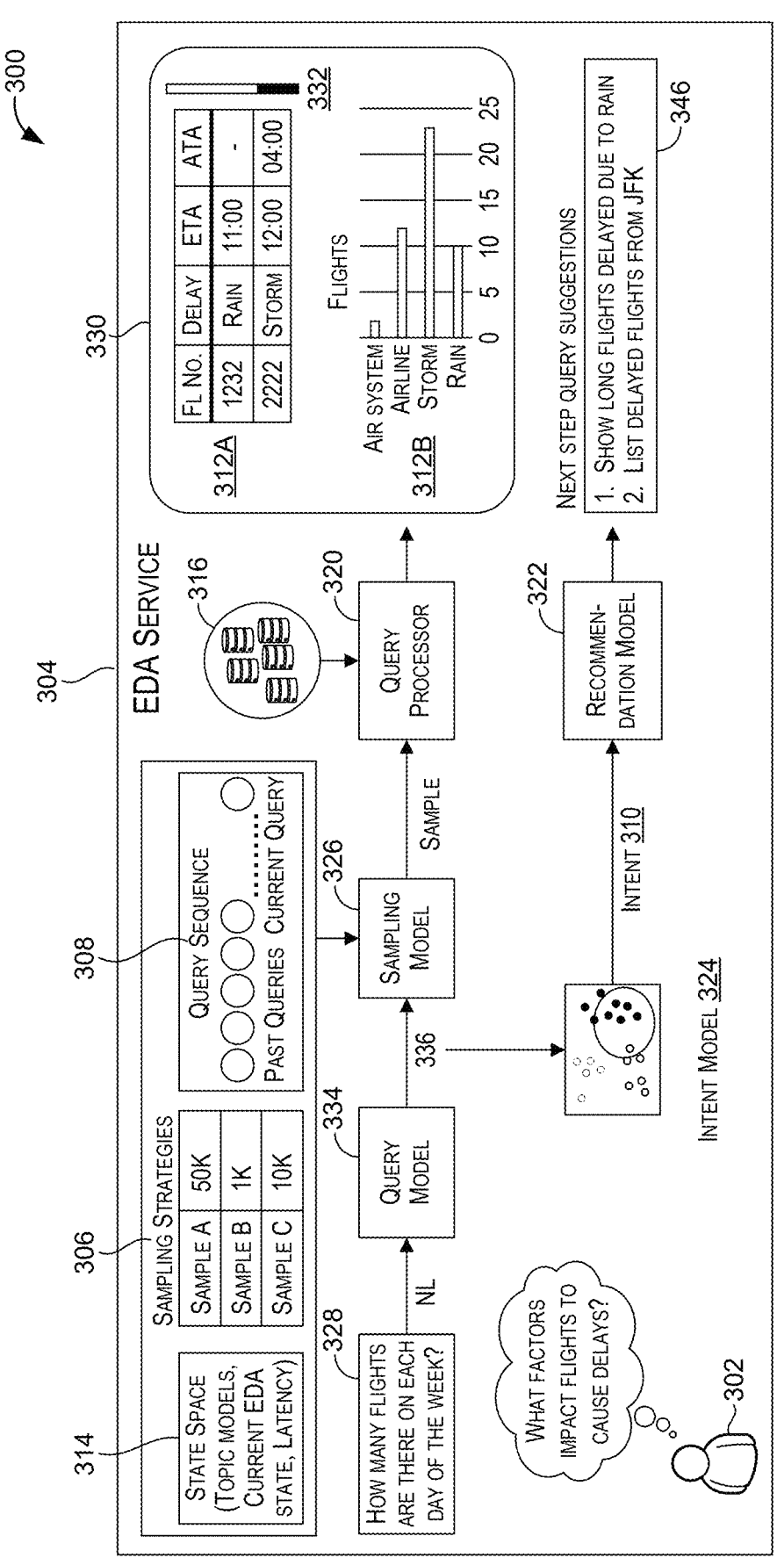
FIG. 3 depicts an environment in which an exploratory data analytics (EDA) system is used to analyze data, in accordance with at least one embodiment.

FIG. 3 is an illustration of an environment 300 in which a user 302 interacts with an EDA service 304 in accordance with at least one embodiment. In various embodiments, the EDA service 304 includes various components operating individually or as a single application and/or service to enable the user 302 to execute various queries, such as a query, of a query sequence 308. In the example illustrated in FIG. 3, the EDA service 304 includes a query model 334, a sampling model 326, an intent model 324, a query processor 320, a recommendation model 322, and a display 330.

In various embodiments, the user 302 provides a natural language query 328 to the EDA service 304 or component thereof, such as the query model 334. In one example, the user 302 is attempting to determine "what factors impact flights to cause delays" based on insights from a dataset query by at least performing an EDA session using the EDA service 304. Continuing this example, the user 302 submits the natural language query 328 "how many flights are there on each day of the week?" In various embodiments, an application or component thereof, such as a user interface, obtains the natural language query 328 and provides the natural language query 328 and/or data representing the natural language query 328 (e.g., text or audio recording) to the EDA service 304 or the query model 334.

In an embodiment, the query model 334 includes a machine learning model trained to generate a structured data query 336, as described above in connection with FIG. 1. For example, the natural language query 328 "how many flights are there on each day of the week?" is converted to a structured data query 336 that, when executed by the query processor 320 on a dataset or a sample 316, obtains data from tables and/or rows of the sample 316 that satisfy the query (e.g., a number of flights for each day of the week). As described above, the structured data query 336, in various embodiments, is provided as an input to the sampling model 326 and the intent model 324.

In various embodiments, the sampling model 326 is a neural network trained using reinforcement learning to select the sample 316. In one example, the sampling model 326 maintains a state space 314 and determines a sampling strategy 306 associated with the sample 316 based on the intent 310 (e.g., determined by the intent model 324, which can include a topic model), the current state, latency information, the current query (e.g., the structured data query 336 and/or the natural language query 328), and/or other inputs to the sampling model 326 such as the query sequence 308, query recommendations 346 (e.g., generated by the recommendation model 322), or other data generated or otherwise obtained by the EDA service 304. In an embodiment, the sampling model 326 then indicates to the query processor the sample 316, and the query processor executes the structured data query 336 using the sample 316.

In an embodiment, the intent model 324 is a machine learning model (e.g., a topic model) that is trained to map a query (e.g., the structured data query 336 and/or the natural language query 328) to the intent 310. In one example, the intent model 324 is trained using historical and/or simulated data to cluster queries based on various intents. Furthermore, in an embodiment, the intent model determines the intent 310 associated with the structured data query and provides the intent 310 as an input to the recommendation model 322 and the sampling model 326.

In various embodiments, the recommendation model 322 generates query recommendations 346 based on past user sessions, the structured data query 336, the query sequence 308, the intent 310, or a combination thereof. For example, the recommendation model 322 is trained based on historical data obtained from the EDA service 304 indicating analysis strategies and methodologies including queries performed by users to the EDA service 304 in order to obtain data and/or insights from a dataset. In an embodiment, the recommendation model 322 is trained using a repository of previously performed EDA sessions (e.g., previously executed query sequences 308), and topic modeling techniques are used to extract a set of implicit intents (e.g., using the intent model 324) from these previously performed EDA sessions. As described above, in various embodiments, the recommendation model 322 takes as an input the intent 310 and the intent associated with other queries in the query sequence 308 (e.g., the intent of the pervious queries) and identifies similar subtrees. In an embodiment, a similarity score is used to identify similar subtrees, where the score is a combination of tree edit distance and an intent similarity.

In various embodiments, the query recommendations 346 are included in the display 330. In addition, in an embodiment, the display 330 includes visualizations 312A and 312B and an indication of a confidence 332 associated with the sample selection. In one example, the visualizations 312A and 312B correspond to the results generated by the query processor 320 when executing the structured data query 336 on the sample 316. In the example illustrated in FIG. 3, visualization 312A and visualization 312B represent the result of particular queries, which can include the same query, different queries, or different components of the same query. Furthermore, in some embodiments, the particular visualization (e.g., pie chart, bar graph, table, etc.) is determined by a machine learning model. For example, the intent model 324 or the sampling model 326 are trained to determine a visualization based on the intent, sample, and/or sampling strategy 306.

Furthermore, in some embodiments, the confidence 332 as described above is determined based on the sample 316 and the structured data query 336. For example, the confidence value indicates the variance of the result (e.g., the result generated by the query processor 320 executing the structured data query 336) using the sample 316. In the example illustrated in FIG. 3, the confidence 332 is indicated as a grey scale where a light shade indicates lower confidence and a dark shade indicates a higher confidence. In various embodiments, different means for indicating confidence can be used in accordance with the present disclosure. For example, colors, symbols, values, or any other method for indicating confidence can be used.

Figure 4:
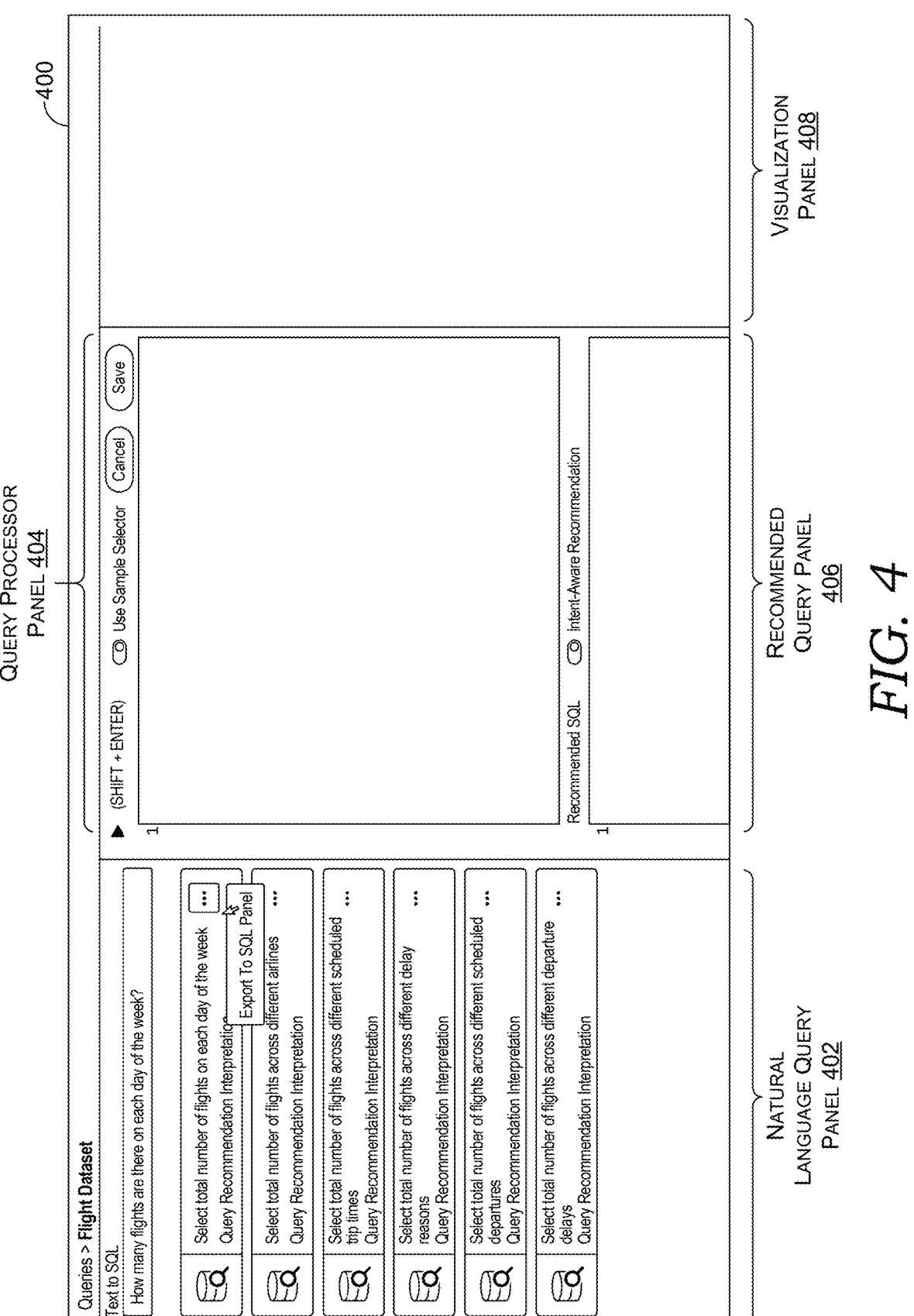
FIG. 4 depicts an environment in which a user interface is used to interact with an EDA system, in accordance with at least one embodiment.

FIG. 4 is an illustration of a user interface 400 in which a user interacts with an EDA tool and/or service in accordance with at least one embodiment. The user interfaces 400, 500, and 600, for example, provide an interface (e.g., frontend) for the EDA tool 104 of FIG. 1 and/or EDA service 304 of FIG. 3. In addition, FIGS. 4, 5, and 6, in various embodiments, represent different intervals of time of a single EDA session. For example, the user interfaces 400, 500, and 600 represent a single EDA session at different states or different queries in a sequence of queries. Furthermore, in various embodiments, the user interfaces 400 includes a natural language query panel 402, a query processor panel 404, a recommended query panel 406, and a visualization panel 408. In various embodiments, the user provides a natural language query through the natural language query panel 402.

In the example illustrated in FIG. 4, the user submits the natural language query "how many flights are there on each day of the week?" The EDA tool, in various embodiments, processes the natural language query and presents recommended queries in the natural language query panel 402. For example, a recommendation model obtains the query and/or intent associated with the query and causes the user interface 400 to present the recommended queries in the natural language query panel 402.

Figure 5:
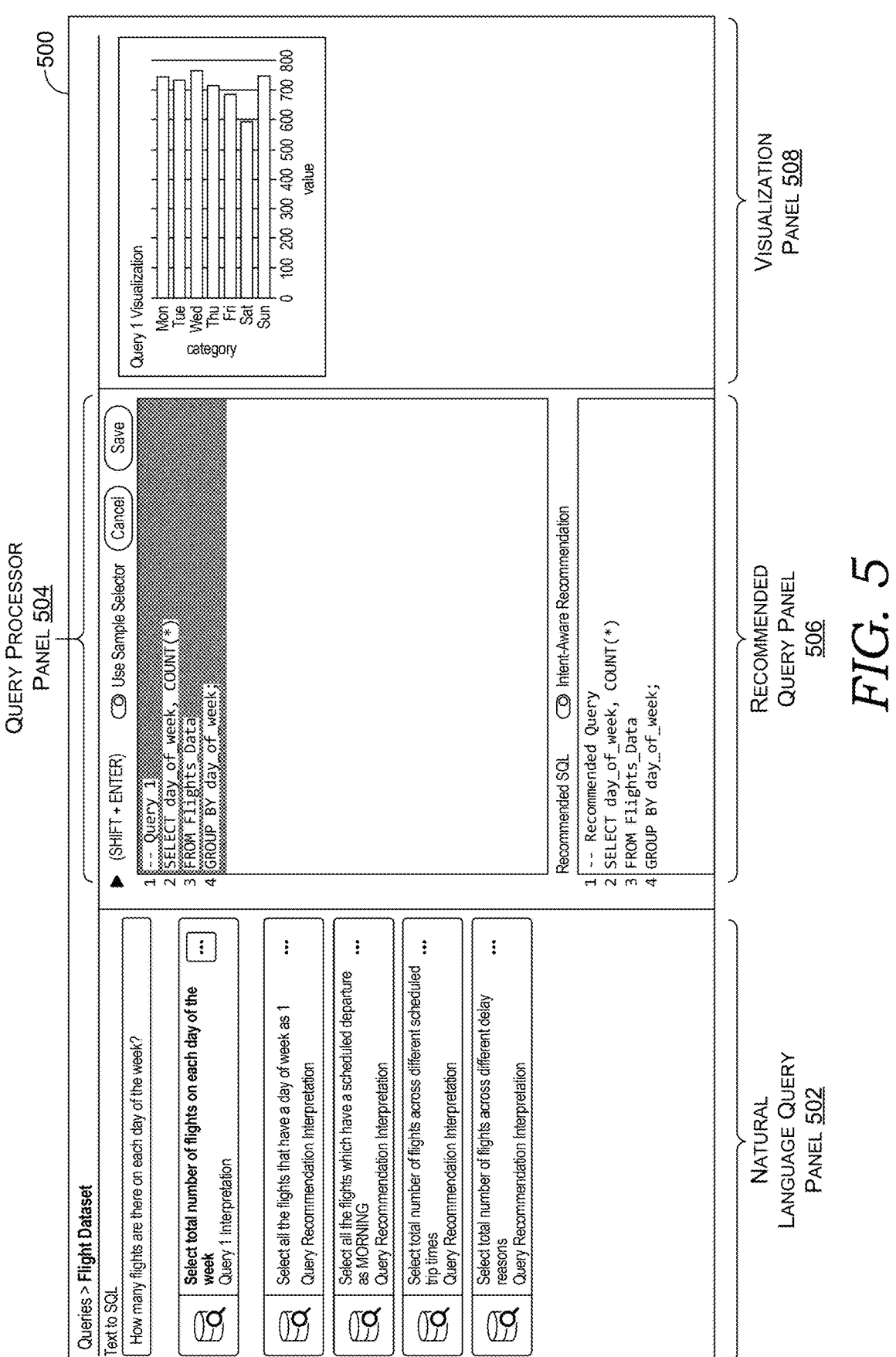
FIG. 5 depicts an environment in which a user interface is used to interact with an EDA system, in accordance with at least one embodiment.

Turning now to FIG. 5, FIG. 5 is an illustration of the user interface 500 in which a user interacts with an EDA tool and/or service with at least one embodiment. Furthermore, in various embodiments, the user interface 500 includes a natural language query panel 502, a query processor panel 504, a recommended query panel 506, and a visualization panel 508. As described above, in various embodiments, the user provides a natural language query through the natural language query panel 502.

Furthermore, in an embodiment, the user selects a natural language query to export or otherwise provide to the query processor panel 504. For example, once the user selects the query "Select the total number of flights on each day of the week" from the natural language query panel 502, a query model or other component of the EDA service generates a structured data query and causes the user interface to display the structured data query in recommended query panel 506, as illustrated in FIG. 5. As described above, the structured data query, in one example, includes source code or other executable code that, when executed by a query processor, causes the query processor to execute the query on a sample and/or dataset.

In an embodiment, the recommended query panel 506 displays the structured data query and allows the user to edit the source code prior to submitting or otherwise causing the query processor to perform the query operations. In one example, once the users cause the query processor to perform the query operations (e.g., by selecting the shift and enter keys, as illustrated in the user interface 500), the query processor panel 504 displays the query and indicates the confidence associated with the query using a sample and/or sampling strategy selected by a sampling model, as described above. As illustrated in FIG. 5, the confidence is indicated by a pattern and/or shading within the query processor panel 504.

In various embodiments, the visualization panel 508 displays the results of the structured data query displayed in the query processor panel 504. In one example, the user selects the visualization type of the visualization displayed in the visualization panel 508. In another example, the EDA service or component thereof, such as an intent model or sampling model, selects the visualization type of the visualization displayed in the visualization panel 508.

Figure 6:
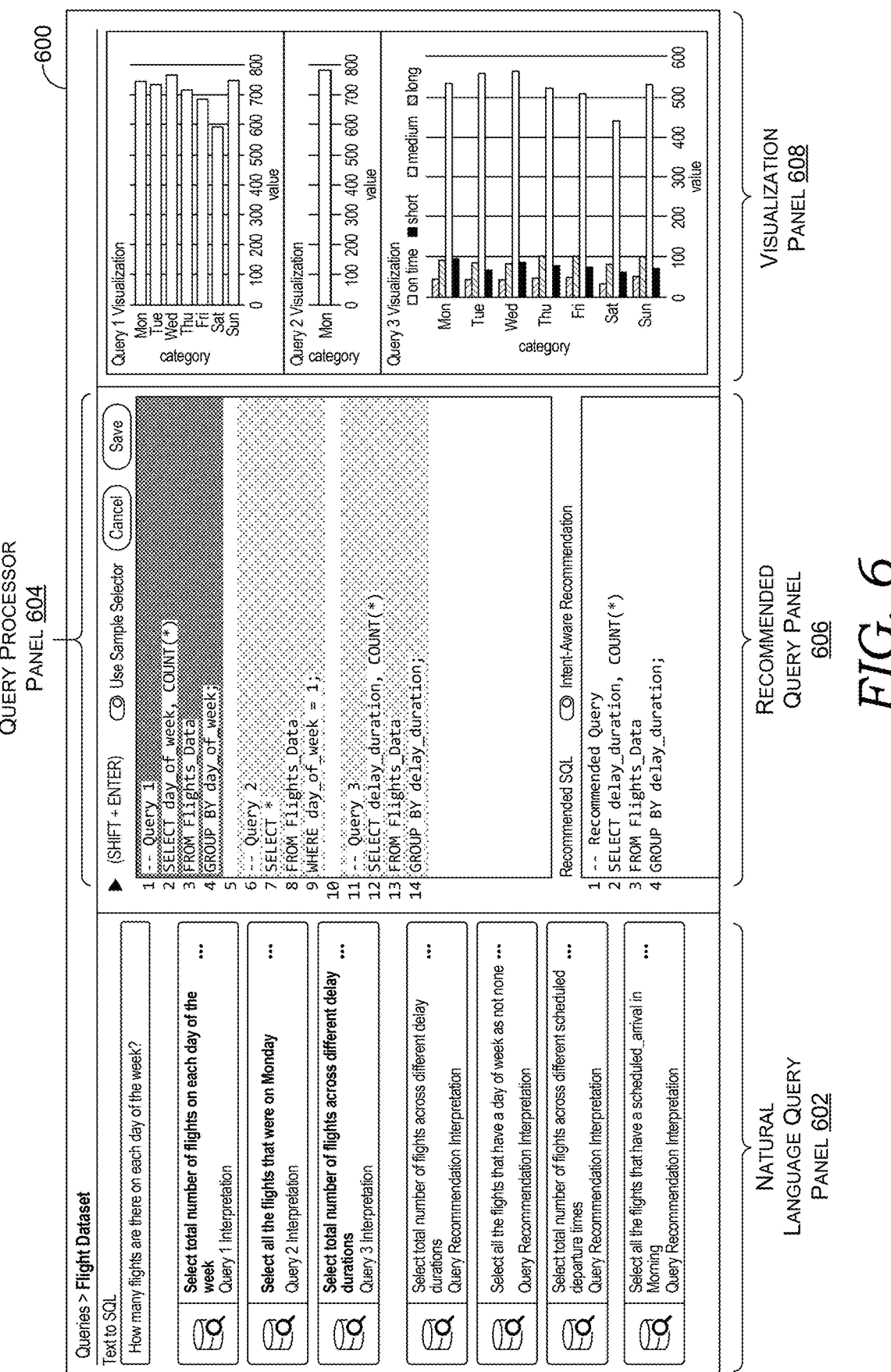
FIG. 6 depicts an environment in which a user interface is used to interact with an EDA system, in accordance with at least one embodiment.

Turning now to FIG. 6, FIG. 6 is an illustration of the user interface 600 in which a user interacts with an EDA tool and/or service in accordance with at least one embodiment.

As illustrated in FIG. 6, the user has executed a plurality of queries (e.g., "Query 1," "Query 2," and "Query 3") and obtained a plurality of corresponding visualizations. In various embodiments, the user interfaces 600 includes a natural language query panel 602, a query processor panel 604, a recommended query panel 606, and a visualization panel 608. Furthermore, as the user selects additional recommended queries from the natural language query panel 602, in various embodiments, the confidence of the samples selected increases. As illustrated in FIG. 6, the confidence is indicated by lighter shading in the query processor panel 604.

Figure 7:
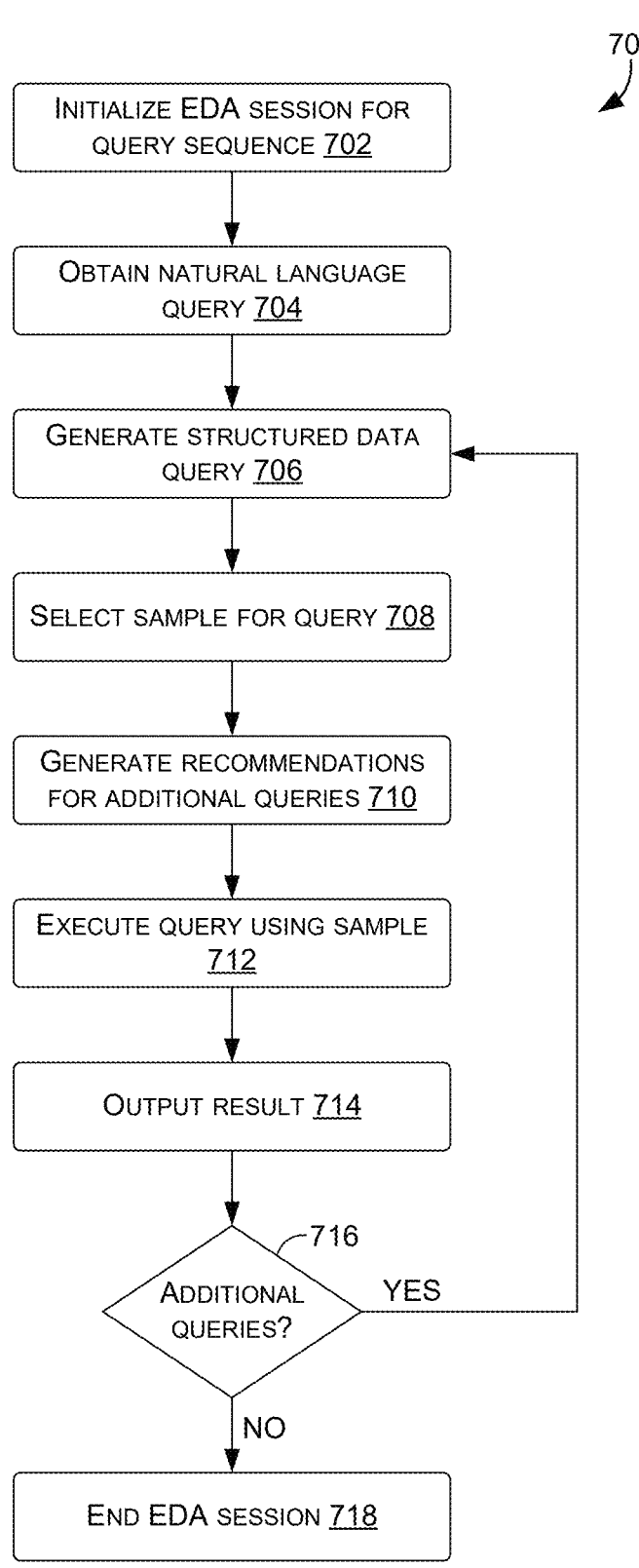
FIG. 7 depicts an example process flow for analyzing data using an EDA system, in accordance with at least one embodiment.

FIG. 7 is a flow diagram showing a method 700 for performing an EDA session in accordance with at least one embodiment. The method 700 can be performed, for instance, by the EDA tool 104 of FIG. 1. Each block of the method 700 and any other methods described herein comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 702, the system implementing the method 700 initializes the EDA session for a query sequence. As described above in connection with FIG. 1, in various embodiments, the EDA tool includes a sampling model that selects a sample for executing a query on the sample. In one example, the EDA tool initializes the state of the sampling model. In other examples, the user connects to the EDA tool using an application and/or user interface.

At block 704, the system implementing the method 700 obtains a natural language query. For example, the user provides a natural language query to the EDA tool via a user interface and input device. For example, as described above, the user can provide the natural language query "how many flights are there on Monday?" through an input device such as a keyboard or microphone.

At block 706, the system implementing the method 700 generates a structured data query. For example, a query model or other machine learning model converts the natural language query to a structured data query such as an SQL query. At block 708, the system implementing the method 700 selects a sample for the query. For example, a sampling model selects a sample of a dataset based on the query and an intent associated with the query. As described above, in various embodiments, an intent model determines an intent associated with the query. For example, the intent model includes a topic model that clusters queries and determines intent based on the clusters.

At block 710, the system implementing the method 700 generates a recommendation for additional queries. For example, a recommendation model or other machine learning model generates recommended queries based on the query and/or intent associated with the query. In an embodiment, the recommended queries are displayed to the user in a user interface. At block 712, the system implementing the method 700 executes the query using the sample. For example, a query processor executes the structured data query using the sample selected by the sampling model.

At block 714, the system implementing the method 700 outputs the results of a structured data query. For example, the EDA tool generates a visualization of the results and causes the user interface to display the results. As described above, a machine learning model, in an embodiment, determines the type of visualization to use to visualize the result based on the query and/or intent. At block 716, the system implementing the method 700 determines whether there are additional queries. For example, the user can select additional queries based on the recommended queries or can provide additional natural language queries (e.g., through the user interface of the application).

If the user provides additional queries, the system implementing the method 700 returns to block 706 and continues the method 700. If no additional queries are provided, the system implementing the method 700 continues to block 718 and ends the EDA session. For example, the user terminates the connection with the EDA tool or otherwise ends the current EDA session through the user interface of the application.

FIG. 8 is a flow diagram of a process 800 for training the sampling model in accordance with at least one embodiment. In some embodiments, the EDA tool performs some or all operations in this method 800 to train the sampling model, and the method 800 uses the framework described above. The EDA tool may perform this method 800 or similar to train the sampling model prior to operation of the sampling model, such as prior to the performance of the above method 700 for interactive exploratory data analysis utilizing the sampling model.

As shown in FIG. 8, at block 802, the method 800 may involve determining training data for use in training the sampling model. As described above, in some embodiments, a simulator is pre-trained to generate query sequences based on execution against the dataset. Thus, the simulator may generate training query sequences for inclusion in the training data. For example, the simulator may generate thousands of training query sequences for inclusion in the training data. In some embodiments, the training query sequences may be used in the training data, or one or more subsets of the query sequences may be withheld and used for testing after training. In one example, a training query sequence simulates choices made by a human analyst when queries are run against the dataset and/or sample. In other embodiments, historical query sequences provided by human analysts in the past are used as training query sequences in the training data in addition to, or instead of, the training query sequences generated by the simulator.

At block 804, the method 800 involves associating a respective intent with queries of that training query sequence. In some embodiments, the EDA tool utilizes the intent model to determine the intent of the queries included in the training query sequence. As described above, the intent model, in an embodiment, includes a topic model such as BTM. For instance, the intent model identifies topics among the training query sequences and/or queries thereof and clusters the training query sequences according to those topics, such that each training query sequence is associated with a respective topic. These topics may then be used as intents as the training proceeds in various embodiments. More specifically, for example, if a first training query sequence is associated with a first topic, then that first training query sequence is deemed to have a first intent, equal to the first topic. In some embodiments, in an unsupervised learning process of associating the training query sequences with respective intents, the intent model learns to associate input query sequences with respective intent distributions (e.g., topic distributions) indicating to what degree an input query and/or query sequence is associated with each topic.

At block 806, the method 800 begins a current query sequence for training the sampling model. At block 806, the system implementing the method 800 begins an outer loop, with iteration focused on a current query sequence, which changes per iteration. In some embodiments, beginning the current query sequence involves initializing a state of the sampling model. For instance, initializing the state may involve removing any queries, responses, intents, or computation costs from the state. However, the sampling model, in some examples, retains any learning that has already occurred. For instance, such learning may already be incorporated into the sampling model.

At block 808, the system implementing the method 800 determines a query as part of the current query sequence. For example, a query is selected and/or extracted from the training data for training the sampling model. At block 810, the system implementing the method 800 accesses the state of the sampling model. In some embodiments, for instance, the sampling model checks its own state. The state of the sampling model may include each query in the current query sequence prior to the one determined at block 808, along with each corresponding response. The state, in one example, additionally includes the intent, if any, currently associated with the current query sequence. In some embodiments, the state additionally includes the computation cost for the current query sequence up to the present (e.g., the cost of executing previous queries in the current query sequence against the respective samples selected for them).

At block 812, the system implementing the method 800 causes the sampling model to select a sample for the query. Specifically, for instance, selecting the sample involves selecting the sample from the set of samples that were previously determined, as described above in connection with FIG. 2A. In some embodiments, the sampling model selects the sample based on the state accessed at block 810. Furthermore, in some embodiments, the sampling model selects the sample with an aim to maximize the reward it will receive according to the reward model.

As described above, the reward model is used in some embodiments to train the sampling model to perform sample selection based on an input (e.g., a query and associated intent). In one example, the reward is a function of a combination of one or more of the following: a latency reward that encourages the sampling model to choose a sample that will lead to low latency when processing each query of the current query sequence; an intent reward that encourages the sampling model to preserve an implicit intent of the current query sequence; and a termination reward that encourages the sampling model to preserve expected final results of the current query sequence.

At block 814, the system implementing the method 800 determines a response to the query. For instance, the query processor executes the query against the sample determined or otherwise selected by the sampling model. The query processor, in an embodiment, then outputs a response, such as a response vector. For instance, the response may include a sub-table including a subset of rows, a subset of columns, or a subset of rows and columns of the dataset and of the sample.

At block 816, the system implementing the method 800 updates the sampling model based on the sample selected by the sampling model. In an embodiment, the system implementing the method 800 updates the sampling model based on a difference between the sample selected and the sample indicated by a target function. More specifically, for instance, the system implementing the method 800 updates one or more weights of one or more neural networks of the sampling model, so as to minimize the difference between the action (e.g., the selected sample) at output by the sampling model and the target function.

At block 818, the system implementing the method 800 updates the state of the sampling model. For instance, the sampling model updates its state by adding to the state the query determined at block 810, as represented by a query vector, and the response determined at block 814, as represented by a response vector. Updating the state, for example, also includes updating the computation cost stored in the state by adding the computation cost of the query against the sample. In some embodiments, updating the state includes updating the intent stored in the state, such as by applying the intent model to the current query sequence, including the query determined at block 808, to generate an updated intent distribution. Furthermore, in some embodiments, the intent in the state is changed to the updated intent distribution.

At block 820, the system implementing the method 800 determines whether any more queries remain in the current query sequence. In some embodiments, the query sequence used during training has a fixed number of queries. If one or more queries remain in the query sequence, then the system implementing the method 800 may return to block 808 to determine an additional query for the current query sequence. However, if there are no more queries in the current query sequence, then the system implementing the method 800 proceeds to block 822.

At block 822, the system implementing the method 800 determines whether there are additional query sequences for training the sampling model. In some embodiments, the system implementing the method 800 executes a certain number of query sequences during training. In that case, the system implementing the method 800 determines whether the number of query sequences have been reached. In some other embodiments, the system implementing the method 800 continues introducing queries until the sampling model's performance is sufficiently close to the target function. If the query sequence is deemed not to be the final query sequence for training, then the system implementing the method 800 returns to block 806 to begin another query sequence. However, if the query sequence is the final query sequence, the system implementing the method 800 proceeds to block 824.

At block 824, the training may end. The sampling model may now be fully trained and ready for use in the EDA system. In some embodiments, though, one or more additional training epochs may be used to refine the training.

Figure 9:
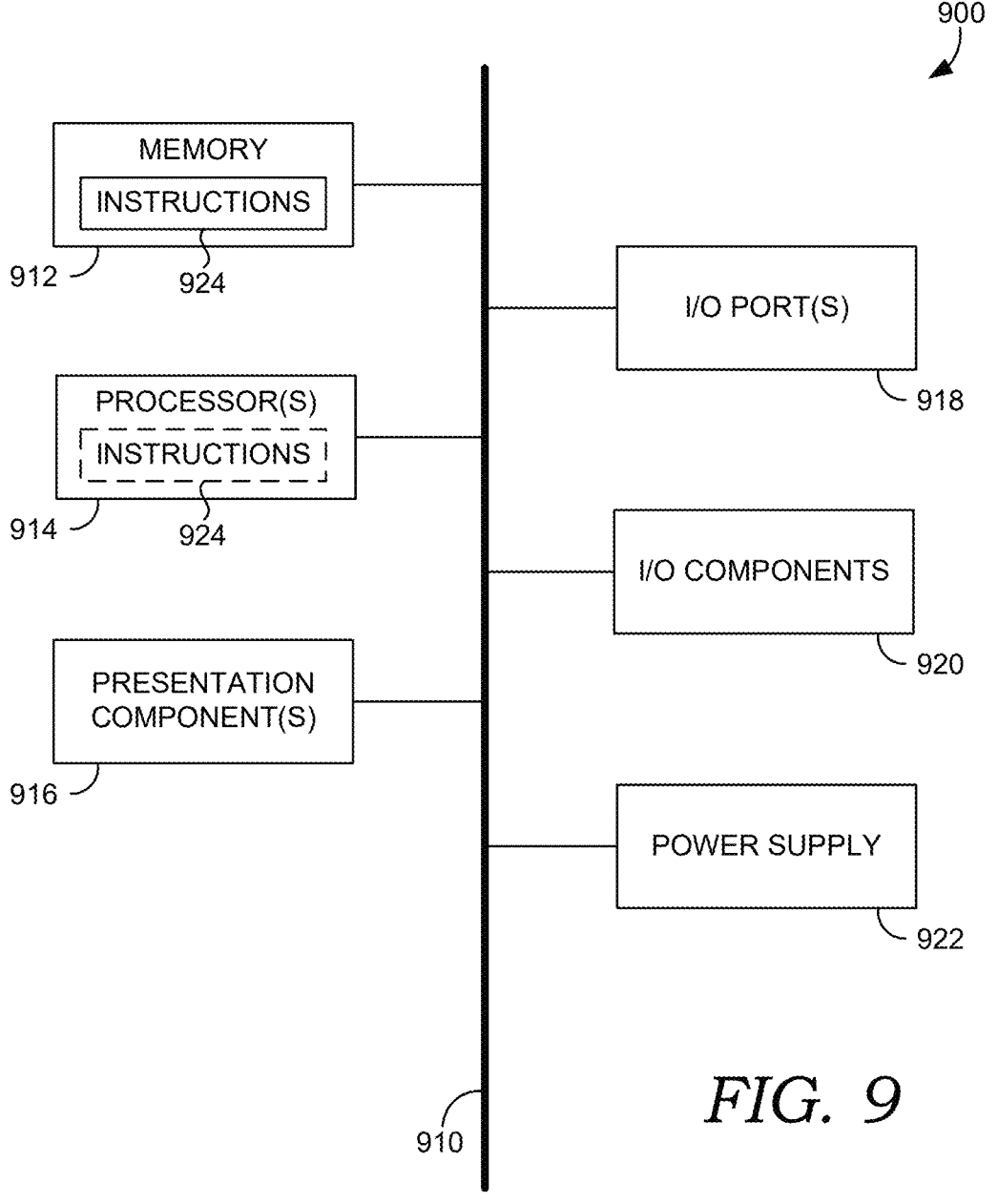
FIG. 9 is a block diagram of an exemplary computing environment suitable for use in implementations of the present disclosure.

Having described embodiments of the present disclosure, FIG. 9 provides an example of a computing device in which embodiments of the present disclosure may be employed. Computing device 900 includes bus 910 that directly or indirectly couples the following devices: memory 912, one or more processors 914, one or more presentation components 916, input/output (I/O) ports 918, input/output components 920, and illustrative power supply 922. Bus 910 represents what may be one or more buses (such as an address bus, data bus, or combination thereof). Although the various blocks of FIG. 9 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 9 is merely illustrative of an exemplary computing device that can be used in connection with one or more embodiments of the present technology. Distinction is not made between such categories as "workstation," "server," "laptop," "handheld device," etc., as all are contemplated within the scope of FIG. 9 and make reference to "computing device."

Computing device 900 typically includes a variety of computer-readable media. Computer-readable media can be any available media that can be accessed by computing device 900 and includes both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium that can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 912 includes computer storage media in the form of volatile and/or non-volatile memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built-in. Illustrative components include a microphone, joystick, game pad, satellite dish, scanner, printer, wireless device, etc. I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 900. Computing device 900 may be equipped with depth cameras, such as stereoscopic camera systems, infrared camera systems, RGB camera systems, and combinations of these, for gesture detection and recognition. Additionally, computing device 900 may be equipped with accelerometers or gyroscopes that enable detection of motion. The output of the accelerometers or gyroscopes may be provided to the display of computing device 900 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order to not obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed:

1. A method comprising:
obtaining, during a session, a natural language query associated with a dataset;
causing a first machine learning model to transform the natural language query to a structured data query;
causing a second machine learning model to determine an intent distribution associated with the structured data query based on a query sequence including a plurality of structured data queries and corresponding results, where the second machine learning model classifies the query sequence into an intent cluster and the intent distribution indicates a probability of the structured data query being associated with the intent cluster;

causing a third machine learning model to determine a sample of the dataset based on the structured data query, a state of the session including the query sequence, the corresponding results, and the intent distribution, where the sample is selected from a plurality of samples generated from the dataset using a plurality of distinct sampling algorithms that are used to generate different subset of the dataset and the sample includes a subset of data included in the dataset based on a first sampling algorithm of a plurality of distinct sampling algorithms, the sample selected by the third machine learning model to minimize a divergence of the intent distribution based on a divergence metric that quantifies the difference between the intent distribution as applied to the dataset and the intent distribution as preserved in the sample; and
causing a query processor to perform the structured data query on the sample of the dataset and generate a visualization based on a result of the structured data query.

2. The method of claim 1, wherein the method further comprises determining a confidence value for a result of the structured data query based on the sample.

3. The method of claim 2, wherein the confidence value indicates an estimate of a variance associated with the result based on the sample.

4. The method of claim 1, wherein the second machine learning model is trained using historical data indicating the plurality of structured data queries executed by the query processor using the plurality of samples of the dataset.

5. The method of claim 1, wherein at least one sample of the plurality of samples is generated using a combination of samples of the plurality of sampling algorithms.

6. The method of claim 1, wherein the method further comprises causing a fourth machine learning model to generate a set of recommended queries of the dataset based on the intent distribution.

7. The method of claim 1, wherein the second machine learning model determines the intent distribution associated with the structured data query by at least:
determining an implicit intent associated with a query sequence comprising the structured data query; and
providing the structured data query and the implicit intent of the query sequence as input to the second machine learning model;
wherein the third machine learning model selects the sample based on an output from the second machine learning model.

8. A non-transitory computer-readable medium storing executable instructions embodied thereon, that, as a result of being executed by a processing device, cause the processing device to perform operations comprising:
obtaining, during a session including a query sequence, a natural language query;
generating a query for a database based on the natural language query;
determining an intent distribution associated with the query based on an output of a first machine learning model, the intent distribution indicating a set of probabilities corresponding to a set of intent clusters associated with the query sequence;
selecting a sample of the database based on the query, the query sequence, corresponding responses, and the intent distribution associated with the query, wherein the sample is selected from a plurality of samples of the database generated based on a plurality of distinct sampling strategies that are used to generate the plurality of samples and selected, by a second machine learning model, to minimize a divergence associated with the intent distribution; and obtaining a result by at least executing the query on the sample.

9. The medium of claim 8, wherein the operations further comprise:

generating a set of recommended queries based at least in part on the query and the intent distribution;

obtaining a selection of a recommended query of the set of recommended queries; and modifying the intent distribution based on the recommended query.

10. The medium of claim 9, wherein the set of recommended queries are generated based on a set of trees generated representing the query sequence, where the set of recommended queries include a number of trees similar to a subset of trees of the set of trees.

11. The medium of claim 9, wherein the set of recommended queries is a generated based on a history of queries associated with the database.

12. The medium of claim 9, wherein selecting the sample further comprises causing the second machine learning model to take an input a state associated with the session indicating a set of previous intent distributions associated with previous queries included in the query sequence.

13. The medium of claim 12, wherein the second machine learning model takes as an input a sequence of queries executed during a prior session.

14. The medium of claim 8, wherein the operations further comprise:

determining a confidence score associated with the query based on the sample; and causing a user interface to display a representation of the confidence score.

15. The medium of claim 8, wherein the operations further comprise:

generating a visualization associated with the query based on the result; and causing a user interface to display the visualization.

16. A system comprising:

a memory component; and a processing device coupled to the memory component, the processing device to perform operations comprising:

obtaining, through a user interface, a natural language query associated with a dataset and a session including a set of queries of with the natural language query is a member;

determining a query of the dataset based on the natural language query;

obtaining an intent distribution associated with the query from a first machine learning model taking as an input the query, the intent distribution indicates a set of probabilities corresponding to a set of intent clusters generated based on the set of queries;

determining a sample of the dataset from a plurality of samples of the dataset based on a first output of a second machine learning model, where the second machine learning model takes as an input the query, the intent distribution, and the set of queries, wherein the sample includes a subset of data included in the dataset selected based on a sampling strategy, the sample selected by a third machine learning model to minimize a divergence of an intent of the intent distribution based on a divergence metric that quantifies a difference between the intent as applied to the dataset and the intent as preserved in the sample;

generating a set of recommend queries based on a second output of the third machine learning model, where the third machine learning model takes as an input the intent; and causing a user interface to display the set of recommended queries and a result by at least executing the query on the sample.

17. The system of claim 16, wherein the third machine learning model further takes as an input a state of the session.

18. The system of claim 17, wherein the generating the set of recommend queries further comprises:

modeling a set of previous executed queries as a set of trees, where nodes of the trees indicate executed queries and associated intents;

modeling the set of queries executed during the session as a second set of trees; and identifying the set of recommend queries by at least comparing a distance of trees in the set of trees and the second set of trees where the intent matches the associated intents.

19. The system of claim 17, wherein the second machine learning model further generates a selection of the sample as the first output, such that the sample is selected to reduce a divergence associated with the intent as a result of executing the query on the sample.

20. The system of claim 16, wherein the operations further comprise determining a confidence associated with the sample, where the confidence indicates an estimate of a variance associated with the result based on the sample.

\* \* \* \* \*